(12) United States Patent
Calin et al.

(10) Patent No.: US 10,028,167 B2
(45) Date of Patent: Jul. 17, 2018

(54) OPTIMIZING QUALITY OF SERVICE IN A CONTENT DISTRIBUTION NETWORK USING SOFTWARE DEFINED NETWORKING

(71) Applicant: Alcatel-Lucent USA Inc., Murray Hill, NJ (US)

(72) Inventors: Doru Calin, Manalapan, NJ (US); Hyunwoo Nam, New York, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 20 days.

(21) Appl. No.: 15/019,085

(22) Filed: Feb. 9, 2016

(65) Prior Publication Data

US 2016/0262044 A1    Sep. 8, 2016

Related U.S. Application Data

(60) Provisional application No. 62/129,949, filed on Mar. 8, 2015.

(51) Int. Cl.
*H04W 28/02* (2009.01)
*H04L 12/851* (2013.01)
(Continued)

(52) U.S. Cl.
CPC ..... *H04W 28/0268* (2013.01); *H04L 41/0896* (2013.01); *H04L 41/5019* (2013.01);
(Continued)

(58) Field of Classification Search
CPC .............. H04W 28/0268; H04W 80/04; H04L 41/0896; H04L 41/5019; H04L 45/22;
(Continued)

(56) References Cited

U.S. PATENT DOCUMENTS 8,867,361 B2 * 10/2014 Kempf .................. H04W 24/02
  370/216
2014/0193154 A1   7/2014 Graham et al.
(Continued)

OTHER PUBLICATIONS

PCT/US2016/021319 Notification of Transmittal of the International Search Report and the Written Opinion of the International Searching Authority, or the Declaration dated Jun. 1, 2016.

*Primary Examiner* — Duc C Ho
(74) *Attorney, Agent, or Firm* — Tong, Rea, Bentley & Kim, LLC

(57) ABSTRACT

A content distribution network including a wireless network segment and an IP wide area network segment includes a virtualized Software Defined Networking (SDN) appliance for optimizing end-to-end quality-of-service (QoS) in the network. The SDN appliance is configured to identify and monitor traffic flows associated with respective content items, obtain end-to-end intelligence data associated with the traffic flow, the end-to-end intelligence data including quality-of-service (QoS) parameters associated with the traffic flow in the wireless network segment and the IP wide area network segment; and dynamically control the traffic flow in one or both of the wireless network segment and the IP wide area network segment based on the end-to-end intelligence data.

20 Claims, 3 Drawing Sheets

(51) Int. Cl.
*H04L 12/801* (2013.01)
*H04L 12/715* (2013.01)
*H04L 12/707* (2013.01)
*H04L 12/725* (2013.01)
*H04L 12/717* (2013.01)
*H04L 12/24* (2006.01)
*H04W 80/04* (2009.01)

(52) U.S. Cl.
CPC ............ *H04L 45/22* (2013.01); *H04L 45/302* (2013.01); *H04L 45/42* (2013.01); *H04L 45/64* (2013.01); *H04L 47/12* (2013.01); *H04L 47/18* (2013.01); *H04L 47/24* (2013.01); *H04L 47/2483* (2013.01); *H04W 80/04* (2013.01)

(58) Field of Classification Search
CPC ....... H04L 45/302; H04L 45/42; H04L 45/64; H04L 47/12; H04L 47/18; H04L 47/24; H04L 47/2483
See application file for complete search history.

(56) References Cited

U.S. PATENT DOCUMENTS

| | | | |
|---|---|---|---|
| 2014/0233389 A1* | 8/2014 | Bantukul | H04L 47/127 370/236 |
| 2014/0254373 A1 | 9/2014 | Varma | |
| 2014/0307556 A1 | 10/2014 | Zhang | |
| 2014/0362790 A1 | 12/2014 | McCann | |
| 2015/0334594 A1* | 11/2015 | Stephens | H04W 74/002 705/14.64 |
| 2016/0127995 A1* | 5/2016 | Merlin | H04W 52/0209 370/311 |

* cited by examiner

100

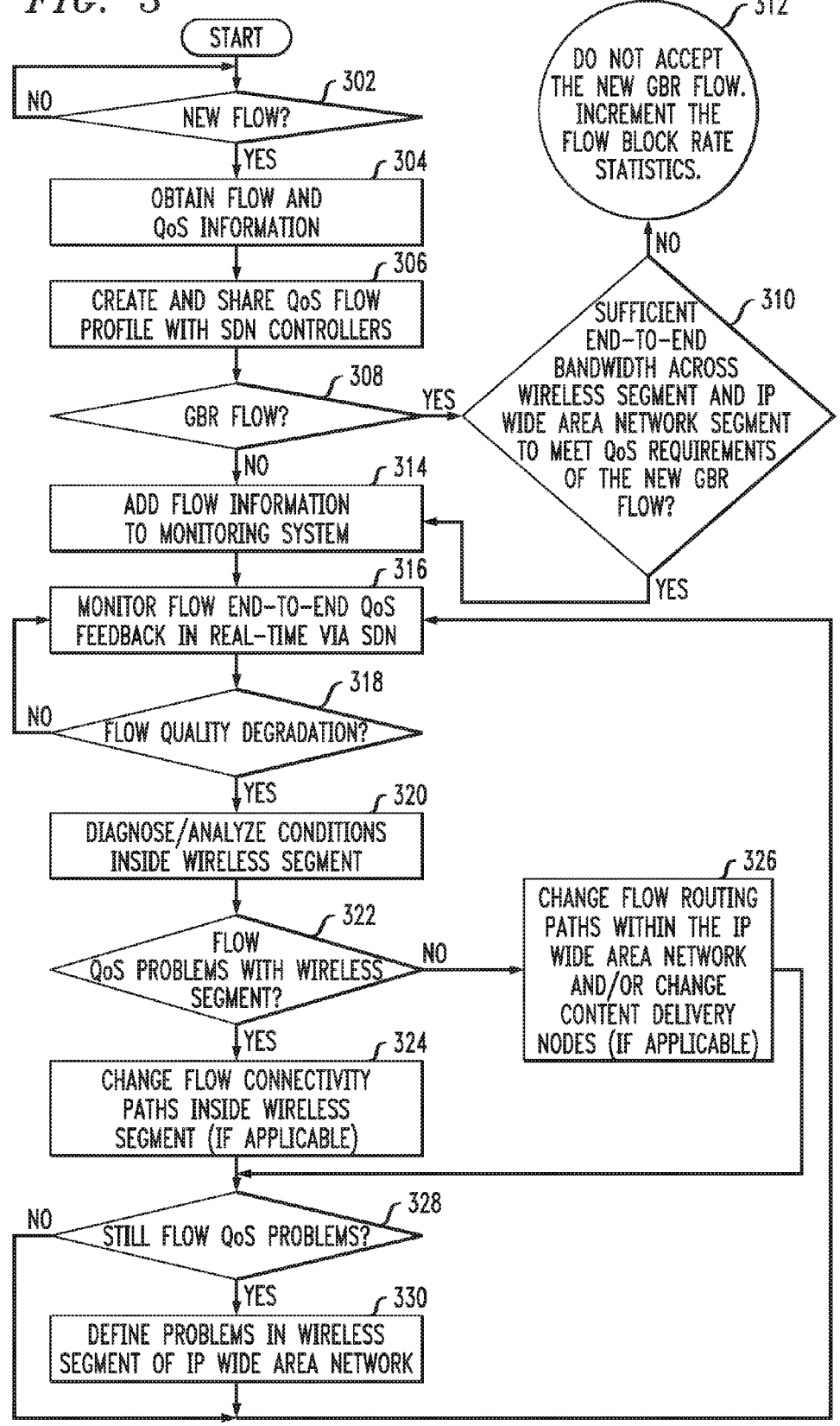

OPTIMIZING QUALITY OF SERVICE IN A CONTENT DISTRIBUTION NETWORK USING SOFTWARE DEFINED NETWORKING

CROSS-REFERENCE TO RELATED APPLICATIONS

The present application claims priority to the U.S. provisional patent application identified as Ser. No. 62/129,949, filed on Mar. 8, 2015, and titled, "Method and Apparatus for Managing Quality of Experience over Wireless Media via Software Defined Networking," the disclosure of which is incorporated by reference herein in its entirety.

FIELD OF THE INVENTION

This application relates generally to communication systems, and, more particularly, to optimizing quality of service, or quality of experience in an SDN-enabled content distribution network.

BACKGROUND OF THE INVENTION

A content distribution network (CDN) is a multimedia data network for delivering multimedia content, including without limitation, online gaming, streaming video, email and voice-over-IP (VoIP) content, from a content provider to various end users. The content distribution network may define a converged network (i.e., having wireline and wireless segments). In one example, the content distribution network includes an IP wide area network component, including a distributed set of servers, platforms, systems, applications or functions or the like, nominally operated by an Internet service provider, and a wireless access network component (e.g., using LTE or WiFi technology), nominally operated by a wireless service provider, for connecting to mobile end-user platforms.

Software Defined Networking (SDN) and Network Function Virtualization (NFV) define virtualization technologies that enable centralized management and control of today's complex networks, and which promise greater flexibility and scalability than traditional networks. To that end, SDN has been proposed to control traffic flows among routers of the IP network segment, so as to enhance existing content distribution networks.

However, although SDN is a promising technology for management of content distribution networks, there are still issues that need to be addressed. In one aspect, there is a need to better manage the end-users' perceived quality of service (QoS), or quality of experience (QoE), or which requires greater awareness of end-to-end traffic flow information, and greater cooperation between network segments. As presently known, SDN provides only limited awareness of traffic flow information, in part, because OpenFlow (i.e., the SDN communication protocol) monitors traffic flows based on conducting Layer 2 through 4 inspection, hence lacking visibility into higher layers such as Layer 4 through 7; and in part, because it has limited access and visibility into the wireless access segment of the converged network. Most congestion of mobile Internet traffic is likely to occur in the wireless access segment (less likely on the fixed parts of the network, such as transit networks and servers), thus SDN controllers as presently known cannot fully provision the end-to-end network conditions without the support of the wireless networks.

SUMMARY OF THE INVENTION

This need is addressed and a technical advance is achieved in the art by a feature for optimizing end-to-end quality-of-service (QoS) in an SDN-enabled content distribution network. Advantageously, the feature includes functions to provide access and visibility into end-to-end traffic flow information across all network segments, including wireless access network and IP wide area network segments of the converged network, and dynamically control traffic flows based on the traffic flow information.

In one example, the feature is realized in a virtualized SDN appliance, which is operably linked to wireless and IP network resources of the converged network. For example and without limitation, the virtualized SDN appliance may reside in a packet gateway (P-GW) or policy and charging rules function (PCRF) of a wireless service provider network, or may comprise an independent component of a wireless service provider network or Internet service provider network.

BRIEF DESCRIPTION OF THE DRAWINGS

The foregoing and other advantages of the invention will become apparent upon reading the following detailed description and upon reference to the drawings in which:

FIG. 3 is a flowchart showing steps performed to dynamically control traffic flows and optimize end-to-end QoS within the converged content distribution network of FIG. 1.

DESCRIPTION OF THE PREFERRED EMBODIMENT(S)

For ease of reference, the detailed description is divided as follows. Section I provides an overview of a feature for optimizing end-to-end quality-of-service (QoS) in an SDN-enabled content distribution network. Section II describes illustrative example scenarios in which the feature may be applied to optimize end-to-end QoS in an SDN-enabled content distribution network.

I. Overview

Figure 1:
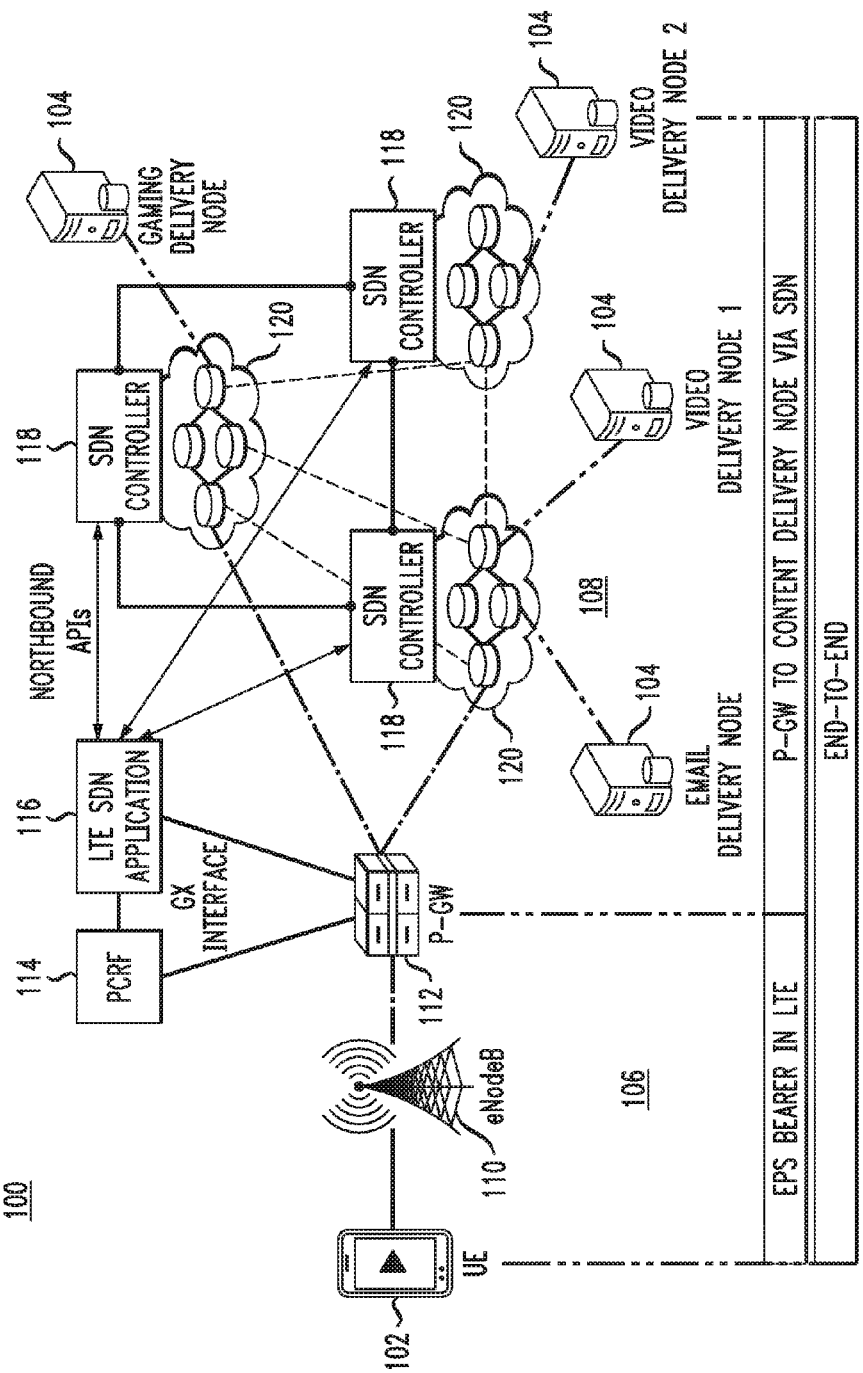
FIG. 1 illustrates an SDN-enabled content distribution network including a virtualized SDN appliance for optimizing end-to-end QoS according to an embodiment of the present invention.

FIG. 1 is an example of an SDN-enabled content distribution network 100 according to an embodiment of the present invention. The network 100 includes one or more user equipment (UE) platforms 102 that are subject to operation by users to request and receive multimedia content. The UE platforms 102 may comprise, for example, laptop computers, desktop computers or mobile computing devices operable, to the extent the user platforms capabilities permit, to request multimedia content from content servers 104. As shown for example and without limitation, the content servers 104 include a gaming delivery node, an email delivery node, and two video delivery nodes. It is noted, the term "end-to-end," in context of content distribution, refers to traffic flows from the video delivery nodes 104 to the user platforms (or "end users") 102.

The content distribution network 100 comprises a converged network, including a wireless access network segment 106 (hereinafter "wireless network segment 106"), nominally operated by a wireless service provider, operably connected to the user platforms 102; and an IP wide area network segment 108, nominally operated by an Internet service provider, operably connected to the content servers 104.

The wireless network segment 106 includes one or more cell sites/paging transceivers 110 (hereinafter "base stations"), which communicate with the user platforms 102 via licensed or unlicensed radio spectrum. In one example, according to fourth Generation (4G) Long Term Evolution (LTE) technology defined by the $3^{rd}$ Generation Partnership Project (3GPP), the base stations 110 are referred to as Evolved Node Bs (eNodeBs or eNBs).

The wireless network segment 106 further includes a packet gateway ("P-GW") 112, Policy and Charging Rules Function ("PCRF") 114, Service Gateway (SGW, not shown) and Mobility Management Entity (MME, not shown), defining, at least in part, an Evolved Packet Core (EPC) as specified by 3GPP standards, for performing certain functions in support of service data flows (SDFs), i.e., content delivery traffic flows to the user platforms 102. The SDFs are carried over wireless bearer channel resources (termed "EPS Bearer in LTE" in FIG. 1).

According to embodiments of the present invention, the wireless network segment 106 further includes a virtualized SDN (Software Defined Networking) appliance 116 operably connected to the P-GW 112 and PCRF 114. As will be appreciated, the respective elements 112, 114, 116 comprise functional elements that may reside in one or more physical devices or structures, For example and without limitation, the virtualized SDN appliance 116 may reside in the packet gateway (P-GW) 112 or PCRF 114, or may comprise an independent component within the EPC.

The packet gateway ("P-GW") 112 resides at the edge of the wireless network segment 106 and interconnects the wireless network segment 106 to the IP wide area network segment 108. The primary roles of the P-GW are to support QoS policy enforcement for the SDFs (applies operator-defined rules for resource allocation and usage), packet filtering (for example, using deep packet inspection (DPI) for application type detection) and charging support.

A Policy and Charging Enforcement Function (PCEF) in the P-GW 112 is in charge of policy control decision-making and flow-based charging functionalities. The PCEF receives, from the PCRF 114, Policy and Charging Control (PCC) rules that include SDF identification, policy control, and flow-based charging rules for each SDF. For applications that need dynamic policy and charging control, the PCEF may obtain additional rules or information from the SDN appliance 116. The PCEF monitors the traffic events, according to the PCC rules for each SDF.

It is noted, QoS policy enforcement for the SDFs has heretofore been provided in wireless access networks, to provide QoS differentiation for EPS bearer traffic between the end user 102 and the P-GW 112, but the QoS parameters have not been shared with the IP network segment 108. A brief review of QoS-enabled services, as presently practiced in an LTE wireless network, is summarized as follows:

When a subscriber requests QoS-enabled services, such as in conjunction with online gaming and Voice over IP (VoIP), a traffic flow template (TFT) including a set of QoS policies is applied to the EPS bearer between the end user 102 and the P-GW 112 for policy and charging control enforcement. QoS parameters such as QCI, ARP, GBR, MBR, APN-AMBR and UE-AMBR are typically used for the wireless resource allocation at transport nodes (e.g., eNodeB) when congestion occurs in the network:

QCI (QoS Class Identifier) specifies IP packet forwarding treatment, such as scheduling weights, queue management in transport nodes in LTE and link layer protocol configuration. Nine QCI values in total are standardized in terms of resource type (Guaranteed Bit Rate (GBR) and Non-GBR (N-GBR)), priority, packet delay budget, and packet error loss rate, depending on application service types.

ARP (Allocation and Retention Priority) specifies a relative priority of an EPS bearer compared to other new or existing bearers. For example, when an LTE network is heavily congested and a new EPS bearer has to be established, the LTE entities such as the P-GW, S-GW and eNodeB take account of the ARP of the EPS bearer, so as to decide to remove some existing bearers or accept/refuse the new bearer in the network.

GBR (Guaranteed Bit Rate) and MBR (Maximum Bit Rate). The dedicated bearer consists of two types—GBR and Non-GBR. In a GBR mode, the bandwidth of the bearer is guaranteed. It is serviced with MBR, which indicates the maximum bit rate allowed in the LTE network. The bearer with Non-GBR is typically used for best-effort services, such as file downloading and Web browsing. It has a lower priority when the network experiences congestion.

APN AMBR (APN Aggregate Maximum Bit Rate) and UE AMBR (UE Aggregate Maximum Bit Rate). In a Non-GBR mode, there is no bandwidth limit that controls the maximum bandwidth usage for each bearer. Instead, the APN AMBR is used to limit the total maximum bit rate for all Non-GBR bearers in the same packet data network (PDN). The UE AMBR represents the maximum possible bit rate that a subscriber can use in the LTE network. It is especially designed to prevent any subscriber from consuming all the available bandwidth from others attached to the same eNodeB.

The P-GW 112 estimates the end user's QoS and QoE in one aspect using deep packet inspection (DPI). With DPI, for example, the P-GW is enabled to perform Layer 4 through 7 inspection which provides context-awareness and extracts metadata attributes (e.g., without limitation, uniform resource locator (URL), file name, browser type, cookies, domain name system (DNS) queries, video codec, international mobile subscriber identity (IMSI), session initiation protocol (SIP) caller/callee, device type and operating system). This data is used to calculate networking performance statistics (e.g., without limitation, delay, jitter and application response time) for each flow.

The IP wide area network segment 108 comprises any packet-based network adapted to support content distribution between and among the content servers 104 and the packet gateway 112. As shown, the IP wide area network segment 108 is an SDN-enabled network, which includes various SDN controllers 118 for monitoring and controlling various IP network nodes 120, such as routers, servers or the like, of the IP network segment 108.

According to embodiments of the invention, the SDN appliance 116 communicates with the P-GW 112 and/or PCRF 114 to identify data flows and monitor real-time network conditions associated with the data flows, including LTE QoS parameters (such as QCI, ARP, GBR, MBR, etc.) and DPI information; and shares the information, at least in part, with certain SDN controllers 118 of the SDN-enabled IP network segment 108, so as to provide the SDN controllers 118 greater awareness of end-to-end traffic flow information, and better ability to implement end-to-end QoS-enabled services in the converged network 100. Conversely, the SDN appliance 116 communicates with the SDN controllers 118 to monitor network conditions of the IP wide area network segment 108 and exchange the IP network information, at least in part, with the P-GW 112 and/or PCRF 114 to enable the P-GW/PCRF to enforce and/or modify QoS services of certain data flows. In one embodiment, the SDN appliance 116 communicates with the SDN controllers 118 using northbound APIs, such as Representational state transfer (REST). As will be appreciated, the SDN appliance 116 is a virtualized appliance that may reside in one or more physical devices or structures. For example and without limitation, the SDN appliance 116 may reside in the P-GW 112 or the PCRF 114 of a wireless service provider network, or may comprise an independent component of a wireless service provider network or Internet service provider network.

Figure 2:
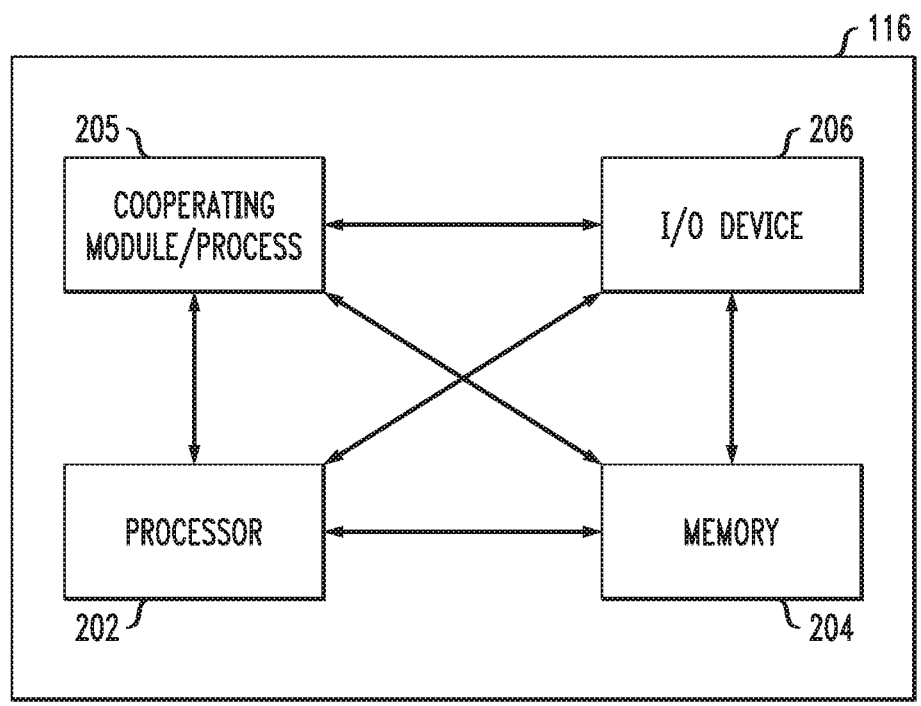
FIG. 2 depicts a high-level block diagram of a virtualized SDN appliance suitable for use in performing the operations and methodology described herein.

FIG. 2 depicts a high-level block diagram of an SDN appliance 116 suitable for use in performing the operations and methodology described herein. The SDN appliance 116 includes a processor 202 (e.g., a central processing unit (CPU) or other suitable processor(s)) and a memory 204 (e.g., random access memory (RAM), read only memory (ROM), and the like).

The computer SDN appliance also may include a cooperating module/process 205. The cooperating process 205 can be loaded into memory 204 and executed by the processor 202 to implement functions as discussed herein and, thus, cooperating process 205 (including associated data structures) can be stored on a computer readable storage medium, e.g., RAM memory, magnetic or optical drive or diskette, and the like.

The SDN appliance 116 also may include one or more input/output devices 206 (e.g., a user input device (such as a keyboard, a keypad, a mouse, and the like), a user output device (such as a display, a speaker, and the like), an input port/interface (e.g., logically connected to the P-GW 112 and PCRF 114), an output port/interface (e.g., logically connected to one or more SDN controllers 118), a receiver, a transmitter, one or more storage devices (e.g., a tape drive, a floppy drive, a hard disk drive, a compact disk drive, and the like), or the like, as well as various combinations thereof).

Turning now to FIG. 3, there is a flowchart of steps to dynamically control traffic flows within the context of a converged content distribution network 100 of the type shown in FIG. 1, so as to optimize end-to-end QoS. The steps of FIG. 3 are performed by the virtualized SDN appliance 116 in conjunction with the P-GW 112/PCRF 114 and one or more SDN controllers 118 of the network 100.

The SDN appliance 116 is generally defined as any hardware device, server, platform, system, application or function, nominally associated with a wireless network segment 106 of the converged network and operated by a wireless service provider, that is operable to receive traffic flow information, including QoS and DPI information from the P-GW 112, and to receive policy and charging information from the P-GW 112 and/or PCRF 114, and communicate certain information and/or instructions to one or more SDN controllers 118 to provide the SDN controllers 118 greater awareness of end-to-end traffic flow information, and better ability to implement end-to-end QoS-enabled services in the converged network 100.

The SDN controllers 118 are generally defined as any hardware device, server, platform, system, application or function, nominally associated with an IP wide area network segment 108 of the converged network and operated by an Internet service provider, that are operable to receive certain information and/or instructions from the SDN appliance 116, or the P-GW 112/PCRF 114 in communication with the SDN appliance 116, and to control traffic flows between and among the various IP network nodes 120 to implement end-to-end QoS-enabled services in the converged network 100.

The SDN controllers 118 are also operable to monitor network conditions of the IP wide area network segment 108 and communicate certain network conditions to the SDN appliance 116. Based on the outside network information obtained from the SDN controllers, the SDN appliance 116, or the P-GW 112/PCRF 114 in communication with the SDN appliance 116 can dynamically change the QCI values of some traffic flows, provided it is acceptable by the corresponding applications, to flexibly reallocate wireless resources among end users 102.

At step 302, the SDN appliance 116 communicates with the P-GW 112 to identify a new incoming traffic flow. With reference to FIG. 1, the traffic flow may characterize, for example, an item of multimedia content delivered or to be delivered from a designated delivery node 104 to a designated client (UE) 102, for which a traffic flow template (TFT) including a set of QoS parameters has been allocated by the P-GW. Generally, each flow is assigned certain QoS parameters corresponding to the type of content and/or the capabilities of the UE 102. For example, video content and gaming requires generally high data rates and low latency, respectively, whereas text content requires generally low data rates and is tolerant to higher latency.

At step 304, the SDN appliance 116 communicates with the P-GW 112 and/or PCRF 114 to obtain intelligence data associated with the new traffic flow in the wireless network segment 106. In one embodiment, the intelligence data includes QoS parameters, included as part of the traffic flow template (TFT) allocated by the P-GW 112.

At step 306, the SDN appliance 116 creates a QoS profile based on the intelligence data received from the P-GW (i.e., associated with the traffic flow in the wireless network segment 106), or optionally obtains the QoS profile from the P-GW/PCRF, and shares the QoS profile with one or more SDN controllers 118. In one embodiment, for example, the SDN appliance may share QoS parameters including QCI, ARP, GBR, MBR, etc., and DPI information obtained from the P-GW 112/PCRF 114 associated with the traffic flow in the wireless network segment 106.

At step 308 the process checks if the new flow is subject to Guaranteed Bit Rate (GBR) requirements. If the answer at step 308 is Yes, the process proceeds to step 310, to check whether there is sufficient end-to-end bandwidth across both the wireless network segment 106 and the IP wide area network segment 108 to meet the QoS requirement of the new GBR flow. In case such QoS requirements cannot be met (the answer at step 310 is No), at step 312 the new GBR flow is not accepted and one increments the flow block rate statistics, which have to be within the acceptable range of the QoS profile. If the answer at step 310 is Yes, the process proceeds at step 314.

Going back to step 308, if the answer is No, the process moves on to step 314, where the information about the new flow is added to the monitoring system and the process proceeds further to step 316.

At step 316, the SDN appliance 116, in communication with the P-GW 112/PCRF 114 and SDN controllers 118, monitors end-to-end QoS feedback associated with the new traffic flow. In one embodiment, the SDN appliance 116, or P-GW 112 in communication with the SDN appliance 116, sends queries to the SDN controllers 118 to obtain network conditions on each path between the P-GW 112 and each content delivery node (i.e., in the IP wide area network segment). This information can be used to select an alternate path or content server in the IP wide area network segment. Conversely, the SDN appliance 116 periodically communicates with the P-GW 112/PCRF 114 to obtain network conditions and QoS parameters of the bearer channel(s) in the wireless network segment 106. This information can be used to select an alternate bearer channel in the wireless network segment 106.

At step 318, the SDN appliance 116, in communication with the P-GW 112/PCRF 114 and SDN controllers 118, determines whether there is a quality degradation associated somewhere within the end-to-end traffic flow. If there is not a quality degradation, the SDN appliance 116 and/or SDN controllers 118 continue to monitor end-to-end QoS feedback associated with the traffic flow at step 316. If there is a quality degradation, the process proceeds to step 320.

At step 320, having identified a degradation in end to end flow quality, the SDN appliance 116, in communication with the P-GW 112/PCRF 114, analyzes/diagnoses network conditions inside the wireless network ("LTE") segment 106 of the converged network; and at step 322, determines whether the quality degradation is attributable to problems in the wireless network segment 106.

If the quality degradation is attributable to the wireless network segment, the SDN appliance 116 operates, in cooperation with the P-GW 112/PCRF 114, to change the flow connectivity/routing paths in the wireless network segment at step 324 in attempt to improve QoS of the traffic flow. Alternatively or additionally, the SDN appliance, in cooperation with the P-GW/PCRF, may change the connectivity/routing paths in the wireless network segment at step 324 to improve QoS of competing traffic flows in the converged network 100.

Depending on implementation, step 324 may be accomplished by the SDN appliance instructing the P-GW 112/PCRF 114 to change one or more routing paths associated with the traffic flow in the wireless network segment; by the SDN appliance sharing end-to-end intelligence data with the P-GW 112/PCRF 114, causing the P-GW/PCRF, based on the intelligence data, to dynamically change one or more routing paths associated with the traffic flow in the wireless network segment; or by the P-GW/PCRF dynamically changing one or more routing paths based on intelligence data independently obtained by the P-GW/PCRF.

In the instance the quality degradation is not attributable to the wireless network segment 106, the quality degradation is likely attributable to the IP wide area network ("WAN") segment 108, and the process proceeds to step 326. At step 326, the SDN appliance 116 operates, in cooperation with one or more relevant SDN controllers 118, to change the routing paths in the IP wide area network segment 108 and/or change the content delivery nodes 104, if applicable, in attempt to improve QoS of the traffic flow. Optionally, the SDN appliance, in cooperation with one or more SDN controllers 118, may change the routing paths in the IP wide area network segment at step 326 and/or change content delivery nodes to improve QoS of competing traffic flows in the converged network 100.

Depending on implementation, step 326 may be accomplished by the SDN appliance instructing one or more SDN controllers 118 to dynamically change one or more routing paths associated with the traffic flow in the IP wide area network segment; by the SDN appliance sharing end-to-end intelligence data with one or more SDN controllers, causing one or more SDN controllers, based on the intelligence data, to dynamically change one or more routing paths associated with the traffic flow in the IP wide area network segment; or by one or more SDN controllers dynamically changing one or more routing paths in the IP wide area network segment based on intelligence data independently obtained by the SDN controllers.

At step 328, the SDN appliance 116, in communication with the P-GW 112/PCRF 114 and SDN controllers 118, determines whether there is still a quality degradation associated with the end-to-end traffic flow, having changed connectivity/routing paths in the wireless network segment at step 324 and/or the IP wide area network segment at step 326. In the instance that quality degradation still exists with the end-to-end traffic flow at step 328, the SDN appliance 116 operates, in cooperation with the P-GW 112/PCRF 114 and SDN controllers 118, to define at step 330 the problems, or the location of the problems (i.e., in the wireless network segment 106 or the IP wide area network segment 108).

Following step 330, the process returns to step 316, and so forth, such that if the quality degradation persists, it may be resolved at step 324, by changing connectivity/routing paths in the wireless network segment or at step 326, by changing routing paths or content delivery nodes in the IP wide area network segment.

Getting back to the state 328, if it was determined that the quality is no longer degraded for the end-to-end traffic flow, after changing connectivity/routing paths in the wireless network segment at step 324 and/or in the IP wide area network segment at step 326, the process returns to step 316 to continue the monitoring of the end-to-end QoS of the traffic flow.

II. Illustrative Example Scenarios

A. Scenario 1: Application Awareness Flow Control From P-GW.

In the example scenario, it is presumed "client A" is playing an online game, and "client B" is watching an HTTP-based adaptive bit rate streaming video in a content distribution network of the type shown in FIG. 1. According to embodiments of the invention, the SDN appliance 116 in cooperation with the P-GW 112/PCRF 114 is able to monitor QoS parameters (e.g., without limitation, QCI) of the respective traffic flows in the wireless network segment and share the information with one or more SDN controllers of the IP wide area network segment. Having awareness of the QoS parameters in the wireless network segment, the SDN controllers 118 may assign certain low-latency paths of the IP wide area network segment for client A. For client B, the SDN appliance 116 in cooperation with the P-GW 112/PCRF 114 may obtain video streaming information (e.g., video bitrate requested from client B) using DPI and share the information with one or more SDN controllers of the IP wide area network segment. The SDN controllers may monitor the downloading datarate of the video flow and, if necessary, change to an alternate path with better networking conditions to accommodate the requested datarate.

B. Scenario 2: User-Device and Dynamic Network Condition-Aware Video Delivery Node Selection.

In the example scenario, it is presumed "client C" and "client D" are connected to the same eNodeB, and attempt to download the same video content in a content distribution network of the type shown in FIG. 1. Client C is using a Smartphone with low resolution, whereas client D is using a tablet with high resolution. At a certain moment, it is presumed that the video delivery node 1 can provide enough bandwidth for client C but not for client D. According to embodiments of the invention, the SDN appliance 116 in cooperation with one or more SDN controllers 118 is able to monitor the network loading conditions of the IP wide area network segment 108 associated with the prospective traffic flows, and dynamically assign or change transport paths, or assign or change content delivery nodes. In the example scenario, the SDN appliance in cooperation with one or more SDN controllers 118 may determine, based on network conditions, and hardware specifications of the client devices, to use video delivery node 1 for client C and video delivery node 2 (which can offer larger bandwidth than the video delivery node 1) for client D.

C. Scenario 3: User-Profile Based Traffic Priority.

In the example scenario, it is presumed that certain clients are prioritized for better end-to-end services than other clients. For example, on the wireless network segment, certain clients may use a wireless priority service (WPS); and on the IP wide area network segment, certain clients may pay for high speed Internet services. According to embodiments of the invention, the SDN appliance 116 in cooperation with the P-GW 112/PCRF 114 and/or one or more SDN controllers 118 is able to prioritize end-to-end QoS services, by implementing priority services, where applicable, within the wireless network segment and/or the IP wide area network segment.

D. Scenario 4: Flexible Resource Allocation at eNodeB Based on Dynamic QoS Parameters.

Within current wireless networks, the standardized QoS platform provides a static QCI table, where at least nine QCI values are used for traffic classification based on application types. According to embodiments of the invention, since the SDN appliance 116 in cooperation with one or more SDN controllers 118 is able to monitor IP wide area network resources, the QCI characteristics can be more flexible in terms of packet delay budget and packet error loss rate. For instance, let us say that clients E and F watch the same video through the same eNodeB. The video delivery node 1 provides a reliable connection, while the video delivery node 2 offers a less reliable connection to the P-GW. The SDN appliance 116 in cooperation with one or more SDN controllers 118 may connect client E to the video delivery node 1 with QCI 8 (based on the static QCI table, 300 ms packet delay budget and 10E-64 packet error loss rate), and client F to video delivery node 2, with better wireless access priority and QCI characteristics (e.g., QCI 2: 150 ms packet delay budget and 10E-3 packet error loss rate, or QCI 7: 100 ms packet delay budget and 10E-3 packet error loss rate, depending on the stringency level) to compensate for the less reliable connection to the delivery node 2. Based on differentiated QoS parameters, eNodeB is expected to efficiently allocate resources, which results in improving user satisfaction. This will also improve the load balancing in the server side networks.

FIGS. 1-3 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of one or more of the methods described herein. The program storage devices may be non-transitory media, e.g., digital memories, magnetic storage media such as a magnetic disks or tapes, hard drives, or optically readable digital data storage media. In one or more embodiments, tangible medium excluding signals may include a set of instructions which when executed are operable to perform one or more of the descried methods. The provided embodiments are also intended to be embodied in computers programmed to perform said steps of methods described herein.

As used herein, the term "eNodeB" or "eNB" may be considered synonymous to, and may hereafter be occasionally referred to as a NodeB, base station, transceiver station, base transceiver station (BTS), small cell, etc., and describes a transceiver in communication with and providing wireless resources to users in a geographical coverage area. As discussed herein, eNBs may have all functionality associated with conventional, well-known base stations in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to eNB (or network), whereas downlink (or forward link) transmissions refer to transmissions from eNB (or network) to UE. According to example embodiments, the Packet Data Network Gateways (P-GW), Serving Gateways (SGW), Mobility Management Entities (MME), Policy and Charging Rules Function (PCRF), UEs, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein a MME, P-GW, PCRF and/or SGW may be any well-known gateway or other physical computer hardware system. The MME, P-GW, PCRF and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, P-GW, PCRF, SGW, eNBs, etc.); and to transmit/receive (wireline or wirelessly) controls signals via a control plane or interface to/from other network elements.

The MME, P-GW, PCRF and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more switches, gateways, MMEs, controllers, other eNBs, UEs, etc.

As discussed herein, the P-GW, PCRF, SGW, and MME may be collectively referred to as Evolved Packet Core network elements or entities (or core network elements or entities). The eNB may be referred to as a radio access network (RAN) element or entity.

What is claimed is:

1. In a converged content distribution network including a wireless network segment and an IP wide area network segment, the wireless network segment operably connected to one or more user platforms, and the IP wide area network segment operably connected to one or more content servers, wherein the converged content distribution network is adapted to deliver content end-to-end from at least one of the one or more content servers to at least one of the one or more user platforms, a method comprising:
    identifying at least one traffic flow associated with a content item allocated for delivery via the converged content distribution network;
    obtaining end-to-end intelligence data associated with the traffic flow, the end-to-end intelligence data including quality-of-service (QoS) parameters associated with the traffic flow in the wireless network segment and the IP wide area network segment; and
    dynamically controlling the traffic flow in one or both of the wireless network segment and the IP wide area network segment based on the end-to-end intelligence data.

2. The method of claim 1, performed by a virtualized Software Defined Networking (SDN) appliance in communication with one or more of a packet gateway and a Policy and Charging Rules Function (PCRF) of the wireless network segment and one or more SDN controllers of the IP network segment.

3. The method of claim 2, wherein the step of obtaining end-to-end intelligence data comprises the SDN appliance:
    receiving, from the one or more of the packet gateway and PCRF, intelligence data including QoS parameters associated with the traffic flow in the wireless network segment; and
    receiving, from the one or more SDN controllers, intelligence data associated with the traffic flow in the IP wide area network segment.

4. The method of claim 2, wherein the step of dynamically controlling the traffic flow comprises the SDN appliance:
    based on the end-to-end intelligence data, instructing one or more SDN controllers to change one or more routing paths associated with the traffic flow in the IP wide area network segment.

5. The method of claim 2, wherein the step of dynamically controlling the traffic flow comprises the SDN appliance:
    based on the end-to-end intelligence data, instructing the packet gateway to change one or more routing paths associated with the traffic flow in the wireless network segment.

6. The method of claim 2, wherein the step of dynamically controlling the traffic flow comprises the SDN appliance:
    sharing, with one or more SDN controllers of the IP wide area network segment, intelligence data obtained from the packet gateway including QoS parameters associated with the traffic flow in the wireless network segment, enabling the SDN controllers, based on the intelligence data, to dynamically change one or more routing paths associated with the traffic flow in the IP wide area network segment.

7. The method of claim 2, wherein the step of dynamically controlling the traffic flow comprises the SDN appliance:
    sharing, with the packet gateway of the wireless network segment, intelligence data obtained from one or more SDN controllers associated with the traffic flow in the IP wide area network segment, enabling the packet gateway, based on the intelligence data, to dynamically change one or more routing paths associated with the traffic flow in the wireless network segment.

8. Apparatus for optimizing quality-of-service (QoS) in a converged content distribution network including a wireless network segment and an IP network segment, the wireless network segment operably connected to one or more user platforms, and the IP network segment operably connected to one or more content servers, wherein the converged content distribution network is adapted to deliver content end-to-end from at least one of the one or more content servers to at least one of the one or more user platforms, the apparatus comprising:
    a wireless network segment interface;
    an IP wide area network segment interface;
    a memory; and
    at least one processor configured to:
        identify at least one traffic flow associated with a content item allocated for delivery via the converged content distribution network;
        obtain end-to-end intelligence data associated with the traffic flow, the end-to-end intelligence data including quality-of-service (QoS) parameters associated with the traffic flow in the wireless network segment and the IP wide area network segment; and
        dynamically control the traffic flow in one or both of the wireless network segment and the IP wide area network segment based on the end-to-end intelligence data.

9. The apparatus of claim 8, comprising a virtualized Software Defined Networking (SDN) appliance operable to communicate with one or more of a packet gateway and Policy and Charging Rules Function (PCRF) of the wireless network segment and one or more SDN controllers of the IP wide area network segment.

10. The apparatus of claim 9, wherein the processor is configured to:
    receive, from the one or more of the packet gateway and PCRF of the wireless network segment, intelligence data including QoS parameters associated with the traffic flow in the wireless network segment; and
    receive, from the one or more SDN controllers, intelligence data associated with the traffic flow in the IP wide area network segment.

11. The apparatus of claim 9, wherein the processor is configured to:
    based on the end-to-end intelligence data, instruct one or more SDN controllers to change one or more routing paths associated with the traffic flow in the IP wide area network segment.

12. The apparatus of claim 9, wherein the processor is configured to:
    based on the end-to-end intelligence data, instruct the packet gateway to change one or more routing paths associated with the traffic flow in the wireless network segment.

13. The apparatus of claim 9, wherein the processor is configured to:

share, with one or more SDN controllers of the IP wide area network segment, intelligence data obtained from the packet gateway including QoS parameters associated with the traffic flow in the wireless network segment, enabling the SDN controllers, based on the intelligence data, to dynamically change one or more routing paths associated with the traffic flow in the IP wide area network segment.

14. The apparatus of claim 9, wherein the processor is configured to:
share, with the packet gateway of the wireless network segment, intelligence data obtained from one or more SDN controllers associated with the traffic flow in the IP wide area network segment, enabling the packet gateway, based on the intelligence data, to dynamically change one or more routing paths associated with the traffic flow in the wireless network segment.

15. In a content distribution network including a wireless network segment and an IP wide area network segment, the wireless network segment operably connected to one or more user platforms, and the IP wide area network segment operably connected to one or more content servers, wherein the content distribution network is adapted to deliver content end-to-end from at least one of the one or more content servers to at least one of the one or more user platforms, a system comprising:
a virtualized Software Defined Networking (SDN) appliance;
one or more of a packet gateway and Policy and Charging Rules Function (PCRF) associated with the wireless network segment; and
one or more SDN controllers associated with the IP wide area network segment, the SDN appliance configured to:
identify at least one traffic flow associated with a content item allocated for delivery via the content distribution network;
obtain end-to-end intelligence data associated with the traffic flow, the end-to-end intelligence data including quality-of-service (QoS) parameters associated with the traffic flow in the wireless network segment and the IP wide area network segment; and
dynamically control the traffic flow in one or both of the wireless network segment and the IP wide area network segment based on the end-to-end intelligence data.

16. The system of claim 15, wherein the SDN appliance is configured to:
receive, from the packet gateway, intelligence data including QoS parameters associated with the traffic flow in the wireless network segment;
receive, from the one or more SDN controllers, intelligence data associated with the traffic flow in the IP wide area network segment.

17. The system of claim 15, wherein the SDN appliance is configured to:
based on the end-to-end intelligence data, instruct one or more SDN controllers to change one or more routing paths associated with the traffic flow in the IP wide area network segment.

18. The system of claim 15, wherein the SDN appliance is configured to:
based on the end-to-end intelligence data, instruct the packet gateway to change one or more routing paths associated with the traffic flow in the wireless network segment.

19. The system of claim 15, wherein the SDN appliance is configured to:
share, with one or more SDN controllers of the IP wide area network segment, intelligence data obtained from the packet gateway including QoS parameters associated with the traffic flow in the wireless network segment, enabling the SDN controllers, based on the intelligence data, to dynamically change one or more routing paths associated with the traffic flow in the IP wide area network segment.

20. The system of claim 15, wherein the SDN appliance is configured to:
share, with the packet gateway of the wireless network segment, intelligence data obtained from one or more SDN controllers associated with the traffic flow in the IP wide area network segment, enabling the packet gateway, based on the intelligence data, to dynamically change one or more routing paths associated with the traffic flow in the wireless network segment.

* * * * *